United States Patent [19]

Chen

[11] Patent Number: 5,522,687
[45] Date of Patent: Jun. 4, 1996

[54] SCREW BAND

[76] Inventor: Ho T. Chen, 9F3R, No. 210, Chung Hsueh Rd., Tainan, Taiwan

[21] Appl. No.: 249,709

[22] Filed: May 26, 1994

[51] Int. Cl.$^6$ ............................. F16B 15/08; B65D 85/24
[52] U.S. Cl. .......................... 411/444; 411/442; 411/966; 206/347
[58] Field of Search ..................... 411/442, 443, 411/444, 966; 206/345, 346, 347

[56] References Cited

U.S. PATENT DOCUMENTS

| | | | |
|---|---|---|---|
| 3,211,284 | 10/1965 | Anstett | 206/347 X |
| 3,944,068 | 3/1976 | Maier et al. | 411/442 X |
| 4,007,834 | 2/1977 | Borgersen | 206/347 X |
| 4,019,631 | 4/1977 | Lejdegard et al. | 206/347 |
| 4,932,821 | 6/1990 | Steffen et al. | 411/442 |
| 4,955,476 | 9/1990 | Nakata et al. | 206/347 X |

*Primary Examiner*—Neill R. Wilson
*Attorney, Agent, or Firm*—Pro-Techtor International

[57] ABSTRACT

A screw band of an elongate tape shape having one or two longitudinal sides provided with transporting notches space apart equidistantly, screw holes spaced equidistantly through its thickness, four spaced notches provided around the wall defined by each screw hole, a circumferential wall extending down from the round screw hole wall and having a cone shape or an annular shape, an annular small diameter wall extending down from the circumferential wall, the cone-shaped wall conforming to a sloping wall of a head of a screw for said screw head to rest on an inner surface of the cone-shaped wall, the annular wall having an inner hole just sized only a little larger than a threaded rod portion of the screw to fit through.

4 Claims, 5 Drawing Sheets

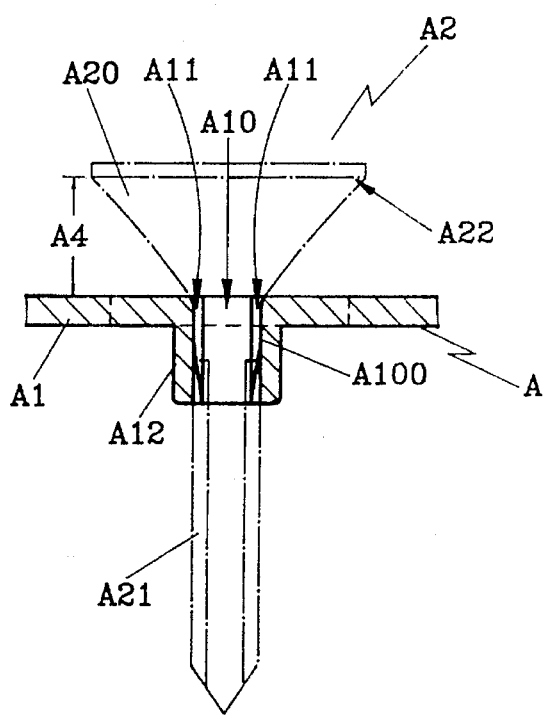
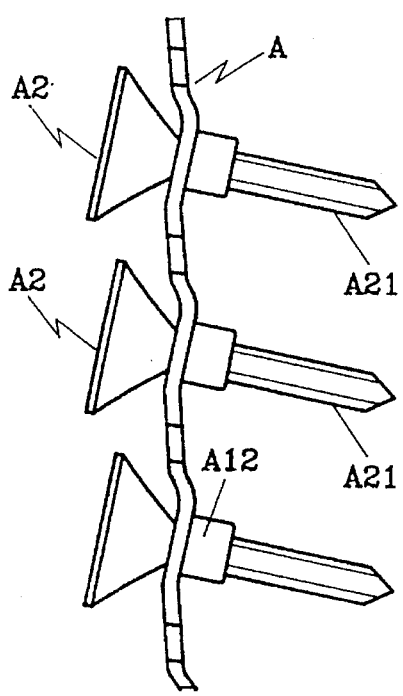
FIG 2
(PRIOR ART)
FIG 1
(PRIOR ART)
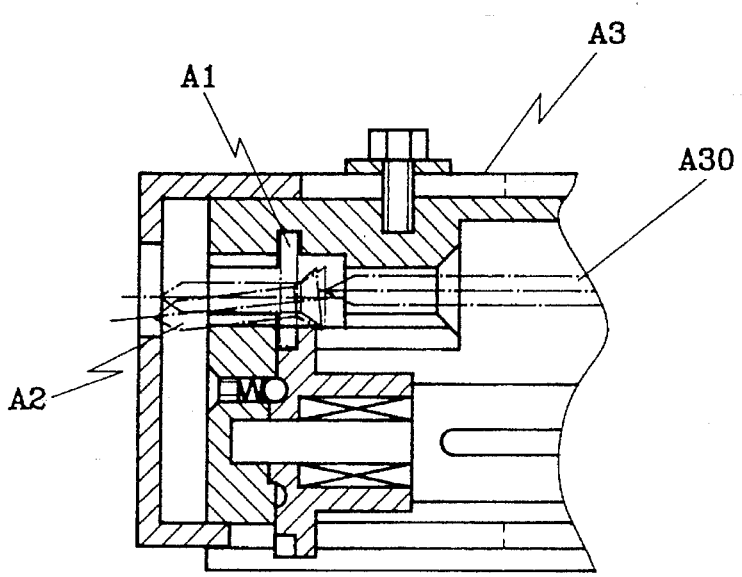
FIG 3 (PRIOR ART)

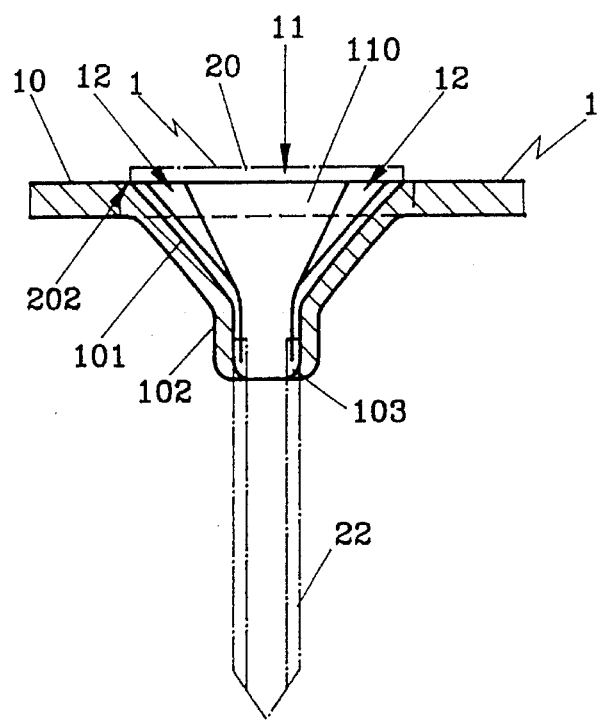
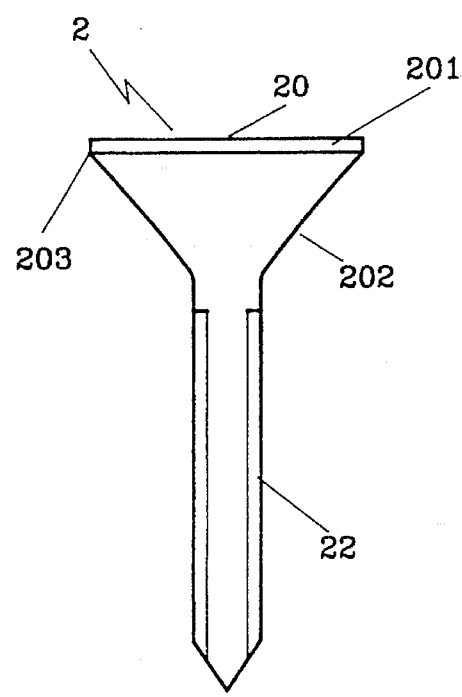
FIG 4    FIG 5
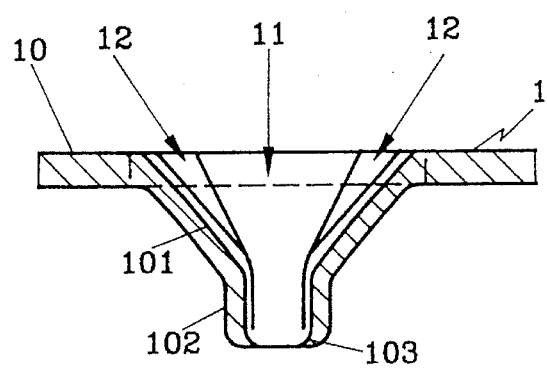
FIG 6

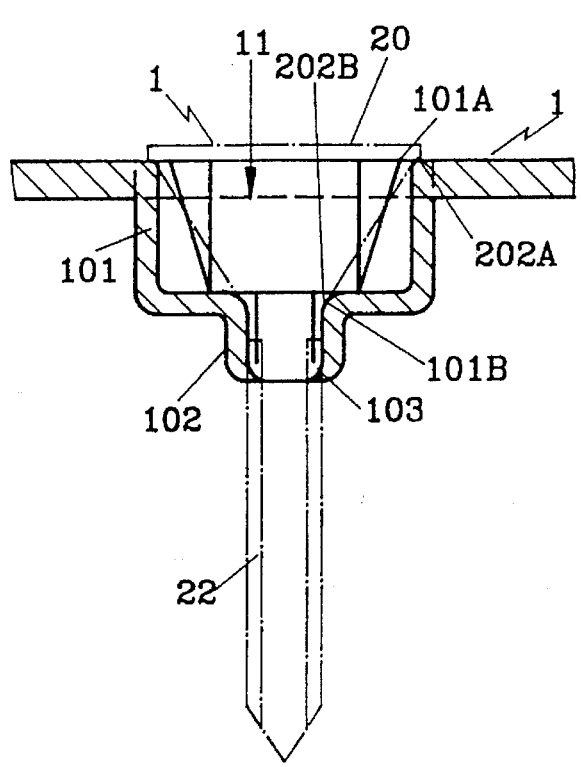
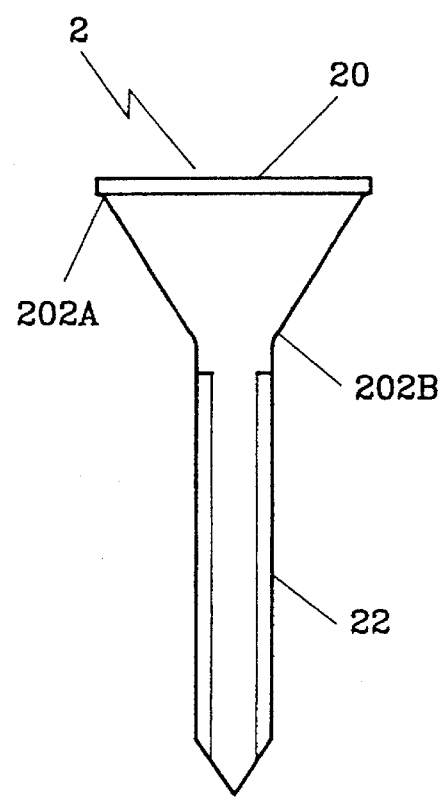
FIG 7      FIG 8
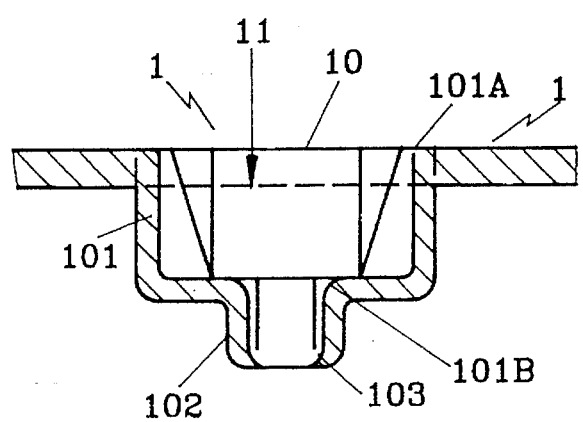
FIG 9

SCREW BAND

BACKGROUND OF THE INVENTION

A conventional screw band shown in FIGS. 1 and 2, or that disclosed by a Japanese patent of No. Hei 4-372373, comprises a screw band A with two logitudinal sides provided with transporting notches and a plurality of screw holes A10 spaced apart through its surface A. Each screw hole A10 has four notches A11 dividing the wall A100 of the screw hole A10 so as to enable the screw to leave easily from the screw hole after the screw is fastened in an object by an automatic driving machine. The screw hole A10 has a diameter almost the same as the diameter A21 of the threaded rod portion of the screw A2. An annular vertical wall A12 extends down from a surrounding wall of the screw hole A10, but the annular vertical wall A12 does not have an inner end curved inward edge. Therefore, there is a substantial distance A4 between the top of the screw A2 and the surface A1 of the screw band A, and a sloping down surface of the head of the screw A2 is completely supported by nothing at all. So, when the screw band A is placed in an automatic driving machine A3, the weight of the screws A2 on the screw band A are not divided to the both sides of the screw band A, with one end dropping down in a sloping condition by their weight imbalance as shown in FIG. 2. Then there arises a difficulty for a driver A30 in an automatic driving machine A3 to fit in a driver groove in the head of each screw A2 to perform driving work correctly, to a resultant bad operation of the machine.

There are prior arts disclosed in U.S. Pat. Nos. 3,944,068, 4,932,821, 4,019,631, 3,211,284, 4,007,837 and 4,955,476, 3,211,284, 3,944,068 and 4,932,821 concern a screw band for screws guns, generally having no sloped surface between the head and the body of a screw.

The U.S. Pat. Nos. 4,007,834, 4,019,631 and 4,955,476 concern a bolt band for bits, and they are not held tightly nor in the vertical condition as in the present invention, giving rise to drawbacks as shown in FIGS. 1 to 3.

SUMMARY OF THE INVENTION

An object of this invention to offer a kind of screw band possible to keep screws in its body stably and in a right angle, improving the above-mentioned drawback of a sloping condition of the conventional screw band so that the driver of the automatic driving machine can correctly fit in the driver groove of the haad of each screw when the screw band is placed in the machine.

A feature of this invention is provision of a large opening and a cone-shaped screw hole to conform to a sloping outer surface of a head of a screw and a lower circumferential edge of the head of the screw contacts with the surface of the screw band, preventing each screw from tilting down with its own weight.

Another feature of this invention is the shape of the screw hole made as a speaker i.e. a cone shape or an inverted T.

Another feature of this invention is the inner circumferential wall under each hole of the screw band, being shaped to conform the sloping wall of the head of each screw for the screw to rest thereon, or at least to projecting points on the inner circumferential wall for the sloping wall of the head of the screw to rest thereon to keep the screw in position, not to move around.

One more feature of this invention is an annular wall extending down from a circumferential wall under each screw hole in the screw band has inner round end having a curving inward edge to engage a thread of a screw.

BRIEF DESCRIPTION OF DRAWINGS

FIG. 1 is a cross-sectional view of a conventional screw band.

FIG. 2 is a side view of the conventional screw band in FIG. 1.

FIG. 3 is a cross-sectional view of the conventional screw band used in an automatic screw driving machine.

FIG. 4 is a cross-sectional view of a first embodiment of a screw band in the present invention, showing it combined with a screw.

FIG. 5 is a front view of a screw to be used with the screw band in the present invention.

FIG. 6 is a cross-sectional view of the first embodiment of the screw band in the present invention.

FIG. 7 is a cross-sectional view of a second embodiment of the screw band in the present invention.

FIG. 8 is a front view of a screw to be used with the screw band in the present invention.

FIG. 9 is a cross-sectional view of the second embodiment of the screw band in the present invention.

DETAILED DESCRIPTION OF THE INVENTION

Figure 10:
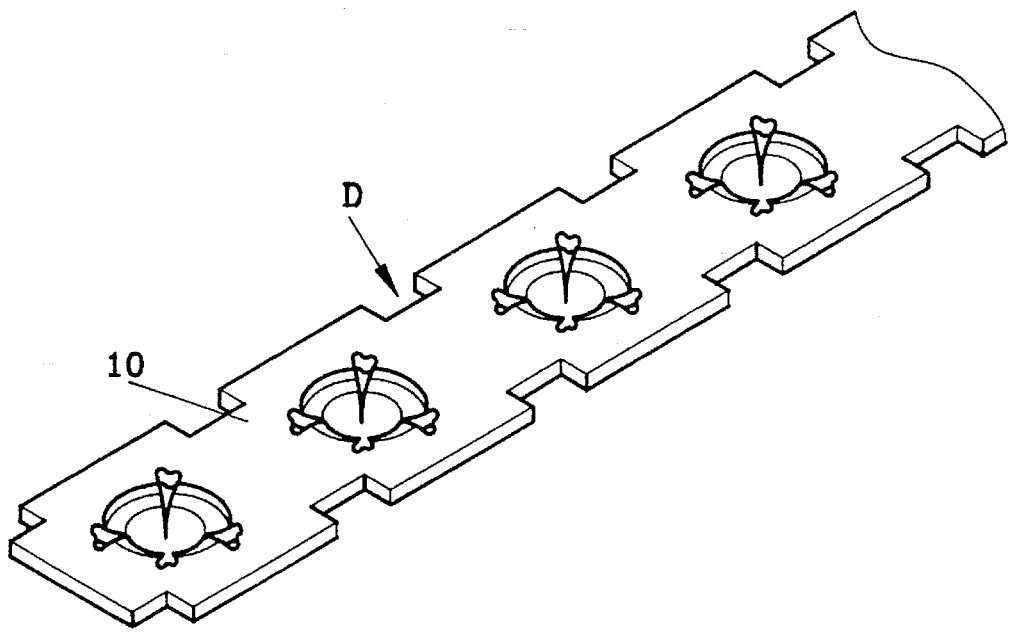
FIG. 10 is a perspective view of the first embodiment of the screw band in the present invention.
Figure 11:
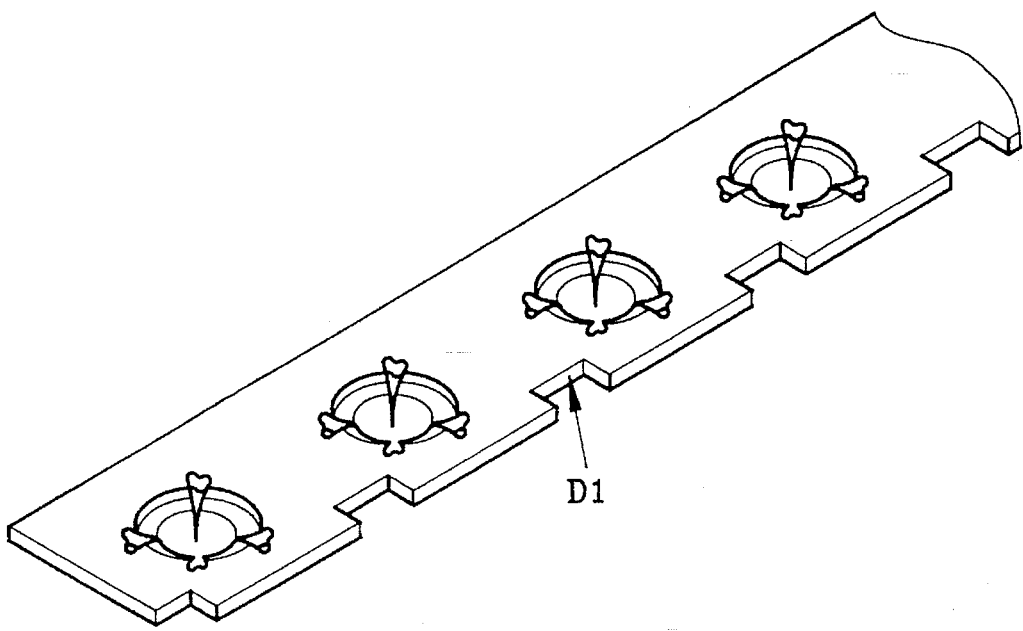
FIG. 11 is a perspective view of a third embodiment of the screw band in the present invention.
Figure 12:
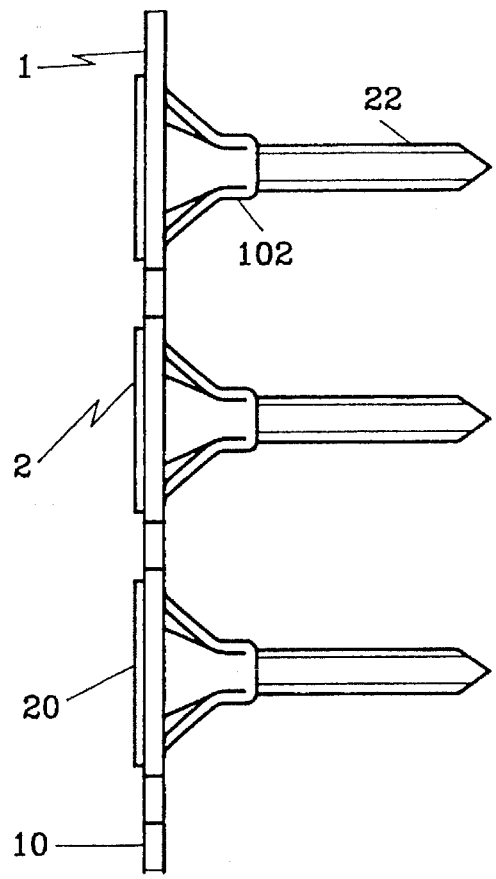
FIG. 12 is a side view of the first embodiment of the screw band in the present invention.

A first embodiment of a screw band 1 in the present invention, as shown in FIGS. 4, 6, and 10, comprises a plurality of transporting notches D formed equidistantly in both longitudinal sides or those D1 formed equidistantly in only one longitudinal side as shown in FIG. 1, a plurality of screw holes 11 provided equidistantly through an longitudinal surface 10. Each screw hole 11 has four nearly triangular notches 12 spaced equally around an screw hole surface 110 and dividing the screw hole surface 110 into equal four sections so that screws 2 may be pinched easily therein and released therefrom easily too.

Figure 13:
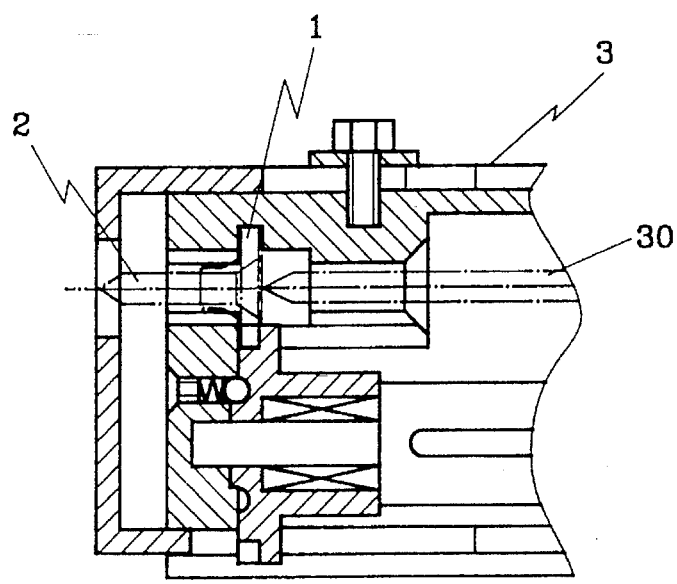
FIG. 13 is a cross-sectional view of the screw band in the present invention used in an automatic driving machine.

Each screw hole 11 of the screw band 1 also has a circumferential wall 101 extending dean from a bottom surface of the screw band for receiving therein a head 20 of each screw 2 as shown in FIGS. 4 and 5, and the circumferential wall 101 may be cone-shaped to slope inward and downward as shown in FIGS. 4 and 6 or shaped cylindrical to extend vertically down as shown in FIGS. 7 and 9. If the cone-shaped wall for the circumferential wall 101 is used, its sloping down angle have to conform to the sloping down angle of the screw head 20 of a screw 2. If the cylindrical wall for the circumferential wall 101 is used, a top round edge 101A and a lower round edge 101B have to support a top circumferential edge 202A and a lower circumferential edge 202B of the sloping surface 202 of the screw 2 so that the screw 2 may be stabilized in the screw hole 11. Then a small diameter annular wall wall 102 is provided to extend down from the circumferential wall 101, having an inner through hole of a diameter just sized only a little larger than a threaded cod portion of the screw 2 for the screw to pass through down. The small diameter annular wall 102 has an inner end curved inward edge 103 to engage the thread 22 of the screw 2. And the inner surface of the circumferential wall 101 of the screw hole 11 completely conforms with the sloping surface 202 of the screw 2, and the lower side 203 of the circumferential surface 201 of the head 20 of the screw 2 closely contacts with the surface 10 of the screw band 1 so that the screw 2 has no space to move down being kept in the screw hole 11 closely and stably, thus stabilized in vertical condition relative to the screw band. Then a driver 30 in an automatic screw driving machine 3 can smoothly and correctly fit in a driver groove in top of the screw 2 to drive it into an object it is supposed to screw, as shown in FIG. 13.

What is claimed is:

1. A screw band of an elongate tape shape having both its longitudinal sides provided with a plurality of transporting notches spaced equidistantly, a plurality of screw holes provided spaced apart equidistantly through its thickness, each said screw hole having four nearly triangular notches spaced equidistantly around the hole wall to divide said hole wall into four sections of the same size, and characteristics that a cone-shaped circumferential wall extends down from a round screw hole wall and is connected with a downward annular wall, an inner sloping-down surface of said cone-shaped circumferential wall conforms to a sloping-down surface of a head of a screw so that said sloping-down surface of the screw can rest on said inner surface of said cone-shaped circumferential wall, said annular wall extends do from said cone-shaped wall, having an inner end curved inward edge to engage a thread of said screw, and thus screws may be kept stabilized in said screw holes of said screw band.

2. The screw band as claimed in claim 1, wherein said screw holes formed in said screw band have a large diameter in the top end and a small diameter in the bottom end so as to fit said screw with closeness.

3. A screw band of an elongate tape shape having both its longitudinal sides provided with a plurality of transporting notches spaced equidistantly, a plurality of screw holes provided spaced apart equidistantly through its thickness, each said screw hole having four nearly triangular notches spaced equidistantly around the hole wall to divide said hole wall into four sections of the same size, and characteristics that each said screw hole connected downward with a smaller-diameter annular wall than said screw hole, an upper cirumferential edge of each said screw hole and an upper circumferential edge of said smaller-diameter annular wall sustain the head of each screw, and said smaller-diameter annular wall has a bottom inner inward edge to engage the thread of each screw so that each screw may be kept stabilized in said screw band.

4. The screw band as claimed in claim 1 or 3, wherein a lower surface of the circumferential edge of the head of said screw contacts with an upper surface of said screw band.

* * * * *

REEXAMINATION CERTIFICATE (3614th)
United States Patent [19]

Chen

[11] B1 5,522,687

[45] Certificate Issued Aug. 25, 1998

[54] SCREW BAND

[76] Inventor: Ho T. Chen, 9F3R, No. 210, Chung Hsueh Rd., Tainan, Taiwan

Reexamination Request:
No. 90/004.900, Jan. 22, 1998

Reexamination Certificate for:
Patent No.: 5,522,687
Issued: Jun. 4, 1996
Appl. No.: 249,709
Filed: May 26, 1994

[51] Int. Cl.$^6$ ............................ F16B 15/08; B65D 85/24
[52] U.S. Cl. ........................ 411/444; 411/442; 411/966; 206/347
[58] Field of Search ........................... 411/442, 443, 411/444, 966; 206/345, 346, 347

[56] References Cited

U.S. PATENT DOCUMENTS

| | | | |
|---|---|---|---|
| 3,211,284 | 10/1965 | Anstett | 206/347 X |
| 3,944,068 | 3/1976 | Maier et al. | 411/442 X |
| 4,007,834 | 2/1977 | Borgersen | 206/347 X |
| 4,019,631 | 4/1977 | Lejdegard et al. | 206/347 |
| 4,932,821 | 6/1990 | Steffen et al. | 411/442 |
| 4,955,476 | 9/1990 | Nakata et al. | 206/347 X |

FOREIGN PATENT DOCUMENTS 61-103617  9/1986  Japan.

*Primary Examiner*—Neill Wilson

[57] ABSTRACT

A screw band of an elongate tape shape having one or two longitudinal sides provided with transporting notches space apart equidistantly, screw holes spaced equidistantly through its thickness, four spaced notches provided around the wall defined by each screw hole, a circumferential wall extending down from the round screw hole wall and having a cone shape or an annular shape, an annular small diameter wall extending down from the circumferential wall, the cone-shaped wall conforming to a sloping wall of a head of a screw for said screw head to rest on an inner surface of the cone-shaped wall, the annular wall having an inner hole just sized only a little larger than a threaded rod portion of the screw to fit through.

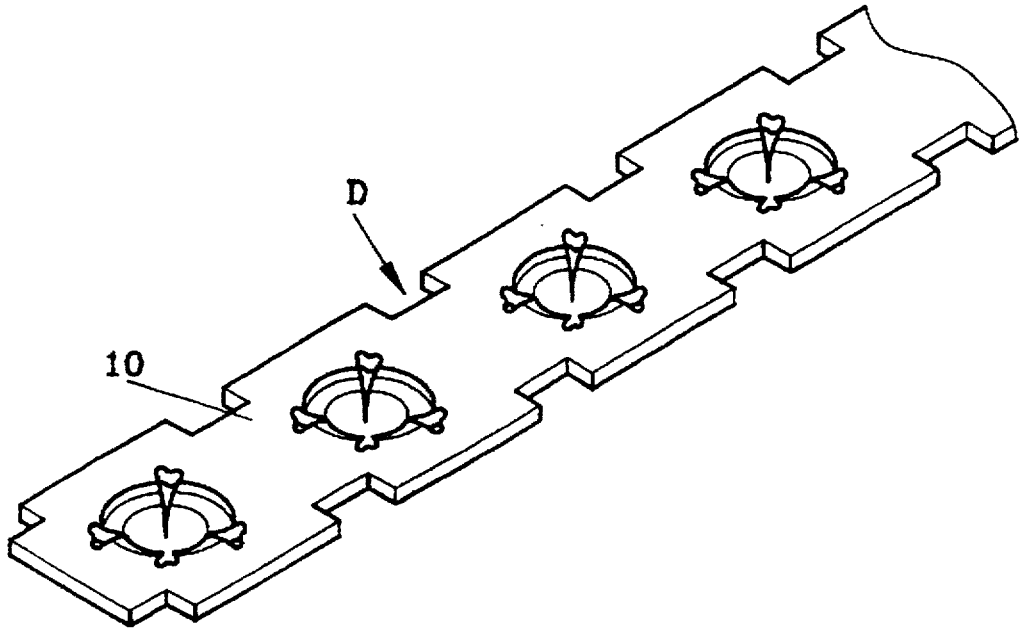

B1 5,522,687

REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1–4 is confirmed.

* * * * *